Feb. 17, 1925.
E. S. STEWART
1,526,391
TESTING APPARATUS
Filed July 30, 1920
2 Sheets-Sheet 1
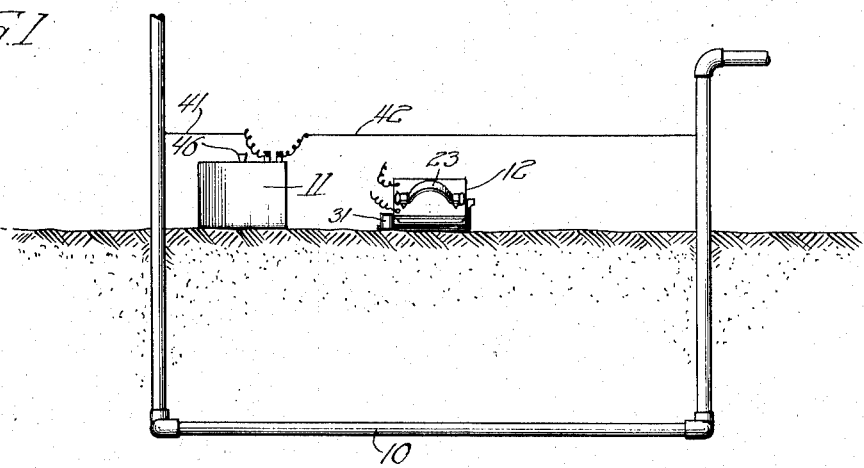
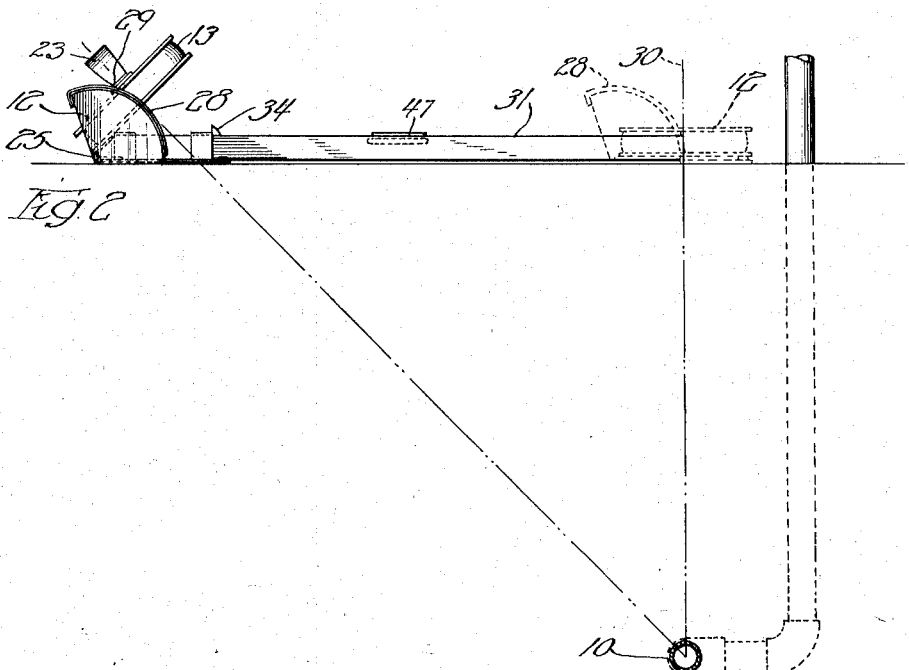
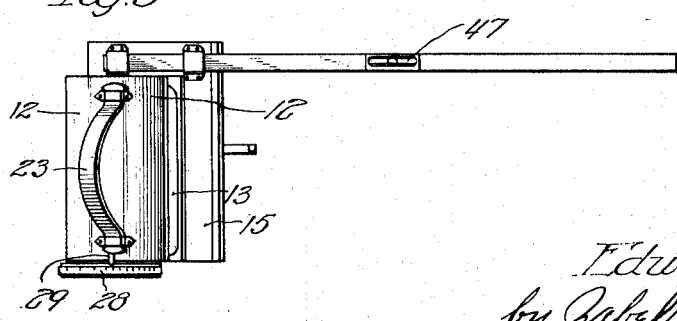
Inventor
Edward S. Stewart
by Gabel + Mueller
Attys.

Feb. 17, 1925.
E. S. STEWART
TESTING APPARATUS
Filed July 30, 1920
1,526,391
2 Sheets-Sheet 2
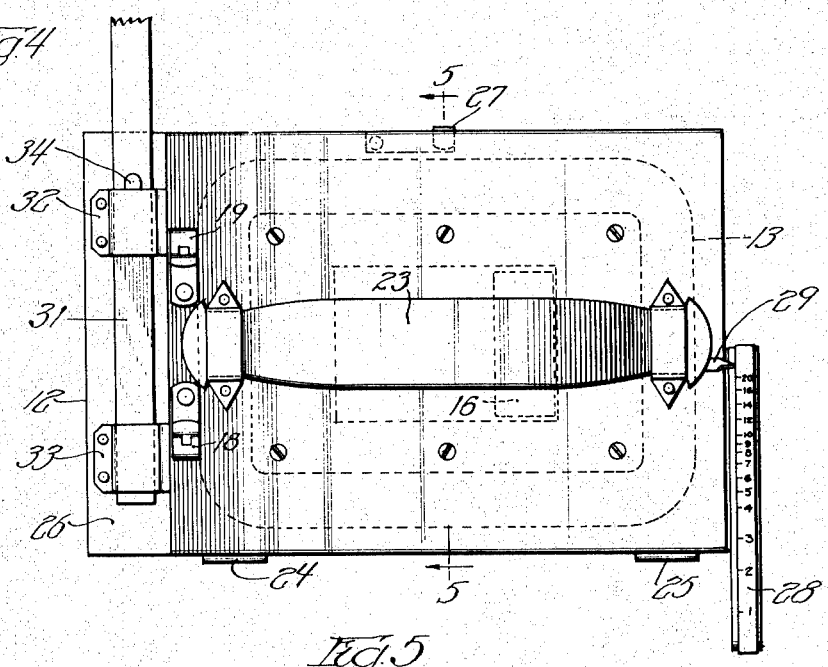
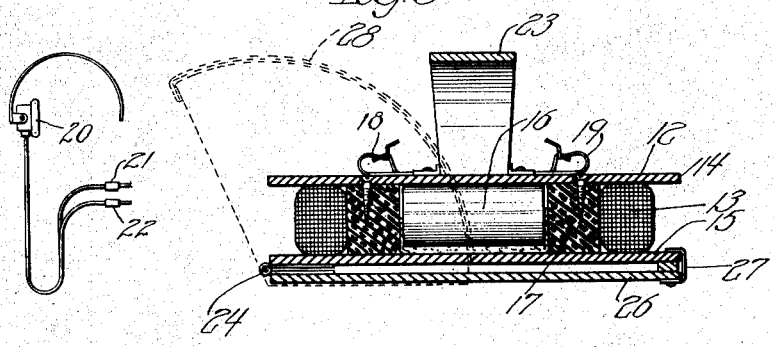
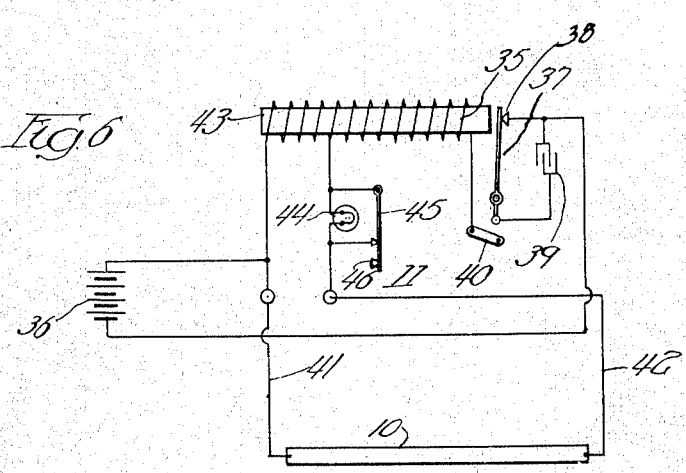
Inventor
Edward S. Stewart
by Gabel & Mueller
Attys.

Patented Feb. 17, 1925.

1,526,391

UNITED STATES PATENT OFFICE.

EDWARD S. STEWART, OF OTTAWA, ILLINOIS, ASSIGNOR TO STEWART BROS., OF OTTAWA, ILLINOIS.

TESTING APPARATUS.

Application filed July 30, 1920. Serial No. 400,016.

*To all whom it may concern:*

Be it known that I, EDWARD S. STEWART, a citizen of the United States, residing at Ottawa, in the county of La Salle and State of Illinois, have invented a certain new and useful Improvement in Testing Apparatus, of which the following is a full, clear, concise, and exact description, reference being had to the accompanying drawings, forming a part of this specification.

My invention relates to methods of testing, and systems and apparatus of this character, and has for its object the provision of improved means and methods capable of use for a variety of purposes, one of which is the accurate location of a pipe where such pipe is hidden from view.

My invention for instance, is of use in locating a pipe which is in the ground, the invention being of such a nature that in addition to locating the vertical plane passing through the pipe it is also possible to accurately determine the depth to which the pipe is buried. Naturally the invention is not limited to the locating of a pipe but may locate any object which is susceptible of the creation of a distinctive electric or magnetic condition in connection therewith.

In one form of carrying out the invention the pipe is connected up with a suitable appliance so that a distinctive current traverses the pipe. The locater element is then moved over the surface of the ground in proximity to the pipe until the vertical plane of the pipe is found, whereupon the locater is moved a prescribed distance away from the vertical plane and the locater again set to a position corresponding to the direction of the pipe from the locater, whereupon the depth of the pipe can be accurately ascertained.

I will describe one form of carrying out my invention more in detail by referring to the accompanying drawings, in which:

Fig. 1 is a view indicating the general arrangement of parts in connection with a pipe to be located;

Fig. 2 is a similar view looking at right angles to Fig. 1 to indicate the method employed in determining the depth of the pipe;

Fig. 3 is a plan view of the locater as shown in Fig. 2;

Fig. 4 is an enlarged plan view of the locater;

Fig. 5 is a sectional view thereof on line 5—5 of Fig. 4; and

Fig. 6 indicates diagrammatically the circuit arrangement.

By referring more particularly to Fig. 1 there is shown a pipe 10 which is buried in the ground and the location of which is to be ascertained. In order to do this any suitable apparatus, such as the apparatus 11, may be employed to charge the pipe 10 with a distinctive current, the apparatus 11 being connected to the pipe at any suitable point beyond the point where it is desired to locate the pipe and wherever such pipe extremities may be accessible. The locater 12 is then brought into play to locate not only the vertical plane of the pipe but also its depth as will be presently explained. This locater consists of a coil 13 suitably held in place by the side walls 14 and 15, the parts 13, 14 and 15 forming a unitary structure. A condenser 16 preferably mounted in a wooden box 17, is located centrally of the coil 13 between the side walls 14 and 15. The condenser has its terminals connected to the binding posts 18 and 19 which are mounted respectively upon the side wall 14, and the coil 13 also has its terminals connected to the binding posts 18 and 19. The condenser is of value in obtaining better indications than would be possible without it, this condenser being bridged as explained across the coil 13. A telephone receiver 20 having the terminals 21 and 22 is employed, these terminals being connected to the binding posts 18 and 19 when the locater is in use. A suitable handle 23 is attached to the side wall 14 and serves as a means for carrying the device upon it, and also adjusting it as will presently appear.

As before stated the elements 13, 14, 15, 16, 17, 18, 19 and 23 are a unitary structure and this unitary structure is connected by means of hinges 24 and 25 to a base plate 26, this base plate carrying a catch 27 which may be moved inwardly or outwardly so that when it is in the position shown in Figs. 4 and 5 it holds the side wall 15 in position adjacent the base plate 26. Whenever the catch 27 is swung outwardly it permits the coil 13, together with the parts that are associated with it in a unitary structure, to be swung about the hinges 24 into the position shown in full lines in Fig. 2.

The base plate 26 also carries a scale 28 suitably arranged upon a circular base so that it may properly cooperate with a pointer or finger 29 carried by the side wall 14. In using the locater 12 the plan of operation is as follows:

The pipe 10 has a distinctive current passing therethrough and the locater 12 with the catch 27 holding the parts as shown in Fig. 5, is moved over the surface of the ground in such a manner that the coil 13 is as closely as may be in a horizontal plane. If the center line of the coil 13 is not within the vertical plane passing through the pipe 10 then the opposite sides of the coil will be unequally affected by the magnetic influences of the distinctive current in the pipe 10 and a noise will be heard in the receiver 20. As soon as the locater however is directly over the pipe so that the central longitudinal axis of the coil 13 coincides with the vertical plane passing through the pipe 10 then the opposite sides of the coil 13 will be equally affected by the magnetic influences due to the current in the pipe 10, and as these magnetic influences are in opposite directions, so far as the result and effect upon the coil 13 is concerned, no current will be induced in the coil 13 and no noise will be heard in the receiver 20. In this manner the vertical plane in which the pipe 10 lies is found. This is indicated in dotted lines by the position of the locater 12 in Fig. 2.

Now then if it is desired to ascertain the depth to which the pipe 10 is buried then the locater 12 is moved from the line 30 (which line indicates the vertical plane passing through the pipe 10) to the left (Fig. 2) a predetermined distance and the catch 27 is released so that the coil 13 with the rest of the parts associated therewith as a unitary structure, may be swung about the hinges 24 and 25 until it again occupies the position in which no noise is heard in the receiver 20. The angular position occupied by the pipe 13 is indicated upon the scale 28 and it will be clear from this that the accurate depth of the pipe can be calculated from the data thus obtained. The distance which the locater 12 is away from the line 30 may be assumed to be the base line and the angle occupied by the coil 13 as indicated upon the scale 28 gives one of the angles of a right angle triangle. With such data the remaining side of the triangle can be easily ascertained trigonometrically. In order to avoid the necessity for calculation, however, the scale 28 is calibrated so that the readings thereon with a given base line accurately give the depth of the pipe 10.

In order to insure the use of the same length of base line a rod 31 may be provided, one of the extremities of which is placed directly over the pipe 10 and the opposite extremity of which is inserted through guides 32—33 carried by the base plate 26. A stop 34 is provided upon this rod so that the locater 12 is a predetermined distance away from the vertical plane of the pipe. Facilities are thus provided for primarily locating the vertical plane of a pipe and then indicating directly to the operator accurately the depth of that pipe without the necessity of any calculation on the part of the operator.

In order to indicate the character of apparatus that may be of use in connection with the device 11 shown in Fig. 1 I have diagrammatically indicated such apparatus in Fig. 6. An auto transformer coil 35 is used in connection with a battery 36, armature 37 and back contact 38. A condenser 39 bridges the contacts 37 and 38. A switch 40 is provided so that when the said switch is moved from the open position shown in Fig. 6 to its closed position the armature 37 vibrates, thereby establishing a distinctive current. This distinctive current is passed through the pipe 10 by means of the conductors 41 and 42, the conductors 41 and 42 being so connected as not to include all of the convolutions of the coil 35. The coil 35 of course has a suitable core 43. In thus connecting the pipe 10 to a portion of the coil 35 a larger current is obtained at less voltage and thus a better effect is produced and more positive indications secured. It is, however, necessary in order to insure accuracy of test that an ample current supply pass through the pipe 10.

It has been found that many of those who use apparatus of this character are not electricians and know little of the electrician's art. Consequently they are very prone to make poor connections to the pipe terminals. To insure ample current a lamp 44 is provided which is directly in the pipe circuit, but which is normally shunted by the switch arm 45. This switch arm is under the control of a push button 46, which push button if the connections have been made must be pushed down by the operator, and if the lamp 44 burns brightly it is an indication that sufficient current is traversing the pipe 10. Otherwise it is incumbent upon the operator to make better connections to the pipe.

A desirable size for the condenser 16 is about ¼ of a micro-farad. The rod 31 may desirably have a level 47 so that it may be in a horizontal plane when the test is made.

From what has thus been explained the nature of my invention will be readily clear to those skilled in the art, and it will also be clear that the invention is not limited to the location of a pipe, but that anything may be located accurately in two directions so long as it is possible to charge the object with a distinctive current.

Having however thus described one form which my invention may take what I claim as new and desire to secure by Letters Patent is:

1. A device of the character described, comprising a base member, a member carrying a winding mounted for hinging movement relative to said base member, a scale carried by one of said members, a rigid indicator carried by the other of said members co-operating with said scale for indicating the relative position of said hinged member to said base member, and means for clamping said hinged member to said base member in parallelism thereto.

2. A device of the character described, comprising a base member, a member carrying a winding mounted for hinging movement relative to said base member, a condenser mounted on said last mentioned member, a scale carried by one of said members and a rigid indicator carried by the other of said members co-operating with said scale for indicating the relative position of said hinged member to said base member.

3. A device of the character described, comprising a base member, a member carrying a winding mounted for hinging movement relative to said base member, a condenser mounted on said last mentioned member within said winding, a scale carried by one of said members and a rigid indicator carried by the other of said members co-operating with said scale for indicating the relative position of said hinged member to said base member.

4. A device of the character described, comprising a base member, a member carrying a winding mounted for hinging movement relative to said base member, a scale carried by one of said members, a rigid indicator carrier by the other of said members co-operating with said scale for indicating the relative position of said hinged member to said base member, and means on said base member for indicating when said base member is in a horizontal position.

5. A device of the character described, comprising a base member, a member carrying a winding mounted for hinging movement relative to said base member, a scale carried by one of said members a rigid indicator carried by the other of said members co-operating with said scale for indicating the relative position of said hinged member to said base member, and a rod rigidly carried by said base member, said rod being of a fixed length and having a predetermined relationship to said scale.

6. A device of the character described, comprising a base member, a member carrying a winding mounted for hinging movement relative to said base member, a scale carried by one of said members, a rigid indicator carried by the other of said members co-operating with said scale for indicating the relative position of said hinged member to said base member, a rod rigidly carried by said base member, said rod being of a fixed length and having a predetermined relationship to said scale and means on said rod for indicating when said rod and base member are in a horizontal position.

7. A device of the character described comprising a base member, a coil carrying member hingedly connected therewith, means for indicating the angular position of said coil carrying member relative to said base member rigidly mounted thereon, and a member aligning with said base member and carrying means to level the same.

8. A device of the character described comprising a base member, a coil carrying member hingedly connected therewith, means for indicating the relative angular position of said members rigidly mounted thereon, and a member aligning with said base member carrying means to level the same, said member being of a fixed length to serve as a measuring base line.

In witness whereof, I hereunto subscribe my name this 27th day of July A. D., 1920.

EDWARD S. STEWART.